US007290338B2

(12) United States Patent
Kim et al.

(10) Patent No.: US 7,290,338 B2
(45) Date of Patent: Nov. 6, 2007

(54) METHOD AND APPARATUS OF MANUFACTURING ELECTRIC POLE

(75) Inventors: Seung Soo Kim, Seoul (KR); Jung Ho Kong, Kyunggi-do (KR)

(73) Assignee: Hammtek Asia, Inc., Seoul (KR)

( * ) Notice: Subject to any disclaimer, the term of this patent is extended or adjusted under 35 U.S.C. 154(b) by 465 days.

(21) Appl. No.: 10/508,408

(22) PCT Filed: Mar. 13, 2003

(86) PCT No.: PCT/KR03/00488

§ 371 (c)(1), (2), (4) Date: Sep. 21, 2004

(87) PCT Pub. No.: WO03/080303

PCT Pub. Date: Oct. 2, 2003

(65) Prior Publication Data

US 2005/0188526 A1 Sep. 1, 2005

(30) Foreign Application Priority Data

Mar. 21, 2002 (KR) ...................... 10-2002-0015421

(51) Int. Cl.

| | |
|---|---|
| ***B23P 17/00*** | (2006.01) |
| ***B21D 39/00*** | (2006.01) |
| ***B28B 1/00*** | (2006.01) |
| ***B28B 21/00*** | (2006.01) |

(52) U.S. Cl. ....................... 29/897.33; 29/446; 29/452; 29/527.3; 264/311; 425/111

(58) Field of Classification Search ............... 29/897.3, 29/897.33, 897.34, 446, 452, 527.3, 527.5, 29/527.6; 264/300, 311, 319; 425/111
See application file for complete search history.

(56) References Cited

U.S. PATENT DOCUMENTS

| | | | | | |
|---|---|---|---|---|---|
| 2,730,783 | A | * | 1/1956 | Kennison | 425/84 |
| 3,993,419 | A | * | 11/1976 | Mori et al. | 425/111 |
| 5,178,887 | A | * | 1/1993 | O'Conner et al. | 425/435 |

* cited by examiner

*Primary Examiner*—Jermie E. Cozart
(74) *Attorney, Agent, or Firm*—Antonelli, Terry, Stout & Kraus, LLP.

(57) ABSTRACT

Disclosed are an electric pole manufacturing apparatus having an improved distal end, capable of reducing the cost, arranging tensile cores corresponding to a design load, and providing a high quality electric pole, and a method of manufacturing the electric pole. The apparatus comprises a mold having a dividable structure; a proximal end plate mounted to one end thereof for forming a proximal end of the electric pole, with a tensile core penetrating through one side thereof; a proximal end tensile plate spaced from the proximal end plate at a constant spacing; a proximal end tensile core fixing plate having the tensile core, with one end of the tensile core penetrating through a surface of the proximal end tensile plate; a distal end plate mounted to one end thereof for forming a distal end of the electric pole, through which the tensile core penetrates; a distal end tensile plate connected to a butt-end plate using a nut for coupling to a tension shaft lifted by a fastening force of the nut; and device for coupling the distal end tensile plate and the distal end plate, to apply the tensile force to the distal end plate.

8 Claims, 7 Drawing Sheets

METHOD AND APPARATUS OF MANUFACTURING ELECTRIC POLE

TECHNICAL FIELD

The present invention relates to a method and apparatus of manufacturing an electric pole using a centrifugal casting, and more particularly, to an electric pole manufacturing apparatus having an improved distal end, capable of reducing the cost, arranging tensile cores corresponding to a design load, and providing a high quality electric pole, and a method of manufacturing the electric pole.

BACKGROUND ART

In general, an electric pole has a cylindrical shape having a slow gradient, and is manufactured to have various length of 7 to 17 m. One end of the electric pole, which is buried under the ground, is called as a proximal end, while the other end is called as a distal end. The electric pole is mainly composed of concrete, and a frame consisting of tensile cores arranged in a longitudinal direction of the electric pole and iron wires wound around and attached to the circumferences of the tensile cores further is incorporated into the electric pole to increase the strength thereof.

FIG. 1 is a cross sectional view illustrating the construction of a conventional apparatus of manufacturing an electric pole, and FIGS. 2 and 3 are view illustrating a coupling structure of a tensile core applied to the conventional apparatus.

Referring to FIG. 1, the conventional apparatus of manufacturing the electric pole has a structure capable of being divided a mold 20 into an opened mold and a closed mold.

The mold 20 includes a proximal end plate 30 mounted to one end thereof for forming a proximal end 12, a proximal end tensile plate 32 spaced from the proximal end plate 30 at a constant spacing, and a proximal end tensile core fixing plate 34 having a tensile core 64 with one side penetrating through a bottom surface of the proximal end tensile plate 32.

The mold 20 further includes a distal end plate 40 mounted on one end thereof for forming a distal end 14, a distal end tensile plate 42 spaced from the distal end plate 40 at a constant spacing and coupled to a tension shaft 50, and a distal end tensile core fixing plate 44 having the tensile core 64 with the other side penetrating through an upper surface of the distal end tensile plate 32. The tension shaft 50 is rotatably engaged to an exterior tension through a bolt type, with the tensile shaft penetrating through a butt-end plate 46, and is fastened by a nut 52.

The distal end plate 40, distal end tensile plate 42, proximal end plate 30, and proximal end tensile plate 32 form a hole, through which both sides of the tensile cores 64, arranged in a circle shape, extend.

The mold 20 is provided on its outer circumference with a plurality of rings (not shown) which are contacted with a rotary roller and receive rotary power from the rotary roller.

The proximal end tensile core fixing plate 34 and the distal end tensile core fixing plate 44 are formed with a number of fastening holes 36 of a peanut shape so as to have a supporting force in a stage that the tensile cores 64 penetrate through the fixing plates 34 and 44, as shown in FIGS. 2 and 3. The fastening hole 36 has a large-diameter portion 37 and a small-diameter portion 38.

The tensile core 64 has a head 66 so that both ends are inserted into the large-diameter portion 37 and the tensile core is engaged by the fixing plate 34 by the head 66.

The operation of the conventional mold will now be described.

First Process

A plurality of tensile cores 64 are cut to have a length of 400 to 500 mm longer than that of the electric pole 10, and then are arranged along a longitudinal direction of the electric pole. Slender iron wires are wound and welded around the surroundings of the tensile cores 64 to form a frame. Both ends of the tensile core 64, arranged in a longitudinal direction in the frame, are headed and pressurized to form the head 66.

Second Process

A release agent is applied on the mold 20, and the both sides of the tensile core 64 penetrate through the distal end plate 40, distal end tensile plate 42, proximal end plate 30, and distal end tensile core 32, so that the head 66 of the tensile core 64 is engaged by the fastening hole 36 of the proximal end tensile core fixing plate 34 and the distal end tensile core fixing plate 44. Then, the frame prepared in the first process is seated on an opened mold 20.

Third Process

In order to prevent the deformation of the entire mold when inputting the concrete into the mold 20, the tensile core 64 is strained by the tensioner. After that, the mold 20 is rotated while the mold is closed, by a centrifuge to form a hollow of a thickness corresponding to that of the defined electric pole 10.

At that time, the tensile core 64 is provided with tension sufficient for maintaining a straight line relative to the tension shaft 50. It is noted that if the tensile core 64 is pulled, the tensile core is stretched, so that the head 66 and a portion adjacent to the small-diameter portion 38 soften to release the tension state.

Fourth Process

The concrete of the electric pole 10 is treated through a steam cure using a boiler to have a desired strength.

Fifth Process

After tensile cores 64 extend between the distal end plate 40 and the distal end tensile plate 42 and proximal end plate 30 and proximal end tensile plate 32 are cut using a welding rod, the electric pole 10 is transferred, and then a fine cut of the tensile cores 64 remaining at the proximal end 12 and distal end 14 and the natural cure is performed to complete the electric pole 10.

With the construction of the conventional electric pole manufacturing apparatus, there is a problem in that the tensile cores 64 are cut to have a length of about 400 to 500 mm longer than that of the electric pole 10 to stretch the tensile plate 64, thereby increasing the cost by providing a surplus length of the tensile core 64.

There is another problem in that the head 66 of the tensile core 64 is inserted into the large-diameter portion 37 of the fastening hole 36, and is moved to the small-diameter portion 38, so that the head is supported by the portion adjacent to the small-diameter portion 38 and the large-diameter portion 37 isopen, thereby causing the shape of the distal end 14 of the electric pole to be poor.

Specifically, after the head 66 of the tensile core 64 is passed through the large-diameter portion 37 of the fastening hole 36 formed in the distal end tensile core fixing plate 44, the head 66 reaches the small-diameter portion 38 by slightly rotating the fixing plate 44. The head is engaged by the portion adjacent to the small-diameter portion 38, thereby restraining the tensile plate 64.

With this construction when the large-diameter portion 37 opens, since the concrete or moisture of the electric pole 10 leaks through the clearance, the shape of the distal end 14 of the electric pole is caused to be poor.

In order to address the problem, in case of closing the exposed large-diameter portion with a separate member, the process is more complicated.

The tensile core 64 is stretched with the construction of the fastening hole 36 constraining the tensile core 64, in which the large-diameter portion 37 communicates with the small-diameter portion 38. The distal end tensile core fixing plate 44 may move based on the tensile plate 64, and the shape of the distal end 14 of the electric pole becomes poor.

There is a further problem in that if a design load of the electric pole 10 is increased, it is impossible to arrange the tensile core 64 at the distal end 14 of a small diameter relative to that of the proximal end 12 of the electric pole 10.

Specifically, if a length of the electric pole 10 is 16 m, a design load of the electric pole is 1300 kg, and a diameter of the distal end 14 is 220 mm, twelve tensile cores 64 having a diameter of 14 mm are required. At that time, a spacing of the tensile cores 64 is 40.58 mm.

The fastening hole 36 formed in the distal end tensile core fixing plate 44 has the large-diameter portion 37 and the small-diameter portion 38. It is difficult to ensure an area forming twelve fastening holes 36 for arranging 12 tensile cores 64, so that a angle between the large-diameter portion 37 and the small-diameter portion 38 from a center axis of the distal end tensile core fixing plate 44 may satisfy the design value. Therefore, it is impossible to manufacture the electric pole 10 according to the design load.

DISCLOSURE OF INVENTION

Accordingly, the present invention is directed to an apparatus and method of manufacturing an electric pole that substantially obviate one or more problems due to limitations and disadvantages of the related art.

It is an object of the present invention to provide an electric pole manufacturing apparatus having an improved distal end to provide a distal end plate forming the distal end of the electric pole with a tensile force.

It is another object of the present invention to provide an electric pole manufacturing method capable of relatively increasing an effective area for fastening an tensile plate to an distal end plate and capable of stretching the tensile core by a rigid bolt.

In order to accomplish the above objects, according to one aspect of the present invention, there is provided an apparatus of manufacturing an electric pole, the apparatus comprising: a mold having a dividable structure; a proximal end plate mounted to one end thereof for forming a proximal end of the electric pole, with a tensile core extending through one side thereof; a proximal end tensile plate spaced from the proximal end plate at a constant spacing; a proximal end tensile core fixing plate having the tensile core, with one end of the tensile core extending through a surface of the proximal end tensile plate; a distal end plate mounted to one end thereof for forming a distal end of the electric pole, through which the tensile core extends; a distal end tensile plate connected to a butt-end plate using a nut for coupling to a tension shaft lifted by a fastening force of the nut; and means for coupling the distal end tensile plate and the distal end plate, to apply the tensile force to the distal end plate.

The tensile core is provided on both sides with a head and a male threaded portion, the corresponding proximal end tensile core fixing plate is formed with a fastening hole through which the head of the tensile core is inserted and caught, and the distal end plate is formed with a female threaded hole for receiving the male threaded portion of the tensile core.

According to another aspect of the present invention, there is provided a method of manufacturing an electric pole, the method comprising the steps of: a) winding and welding an iron wire around a surrounding of a tensile core to form a frame, and heating and pressurizing both ends of the tensile core arranged in a longitudinal direction in the frame to form a head on one end thereof and a male threaded portion on the other end thereof; b) inserting the head of the tensile core into the proximal end plate and distal end tensile core, so that the head is engaged by the fastening hole of the proximal end tensile core fixing plate, and inserting the male threaded portion of the tensile core into the female threaded hole of the distal end plate using the tensile nut, thereby seating the frame on an opened mold; c) lifting the distal end plate coupled to the distal end tensile plate through the coupling ring by rotating the tension shaft using a tensioner, so that a length of the tensile core extended to a bottom of the distal end plate is stretched to a position corresponding to a length of the electric pole; d) inputting concrete into the mold, and rotating the mold in a state of a closed mold using a centrifuge to form a hollow of a thickness corresponding to a defined thickness of the electric pole; e) curing the concrete in the mold to provide the electric pole with a desired demold strength; f) removing the electric pole from the mold by cutting the tensile core extending between the proximal end plate and the proximal end tensile plate and releasing a coupling ring; and g) after finely cutting the tensile core protruding from the proximal end, and removing the distal end plate from the mold by releasing the tensile nut, finely cutting the tensile cores protruding toward the proximal end, and curing the distal end to complete the electric pole.

It is to be understood that both the foregoing general description and the following detailed description of the present invention are exemplary and explanatory and are intended to provide further explanation of the present invention as claimed.

BRIEF DESCRIPTION OF DRAWINGS

The accompanying drawings, which are included to provide a further understanding of the present invention and are incorporated in a constitute a part of this application, illustrate embodiment(s) of the present invention and together with the description serve to explain the principle of the present invention. In the drawings.

BEST MODE FOR CARRYING OUT THE INVENTION

Reference will now be made in detail to a preferred embodiment of the present invention.

Figure 1:
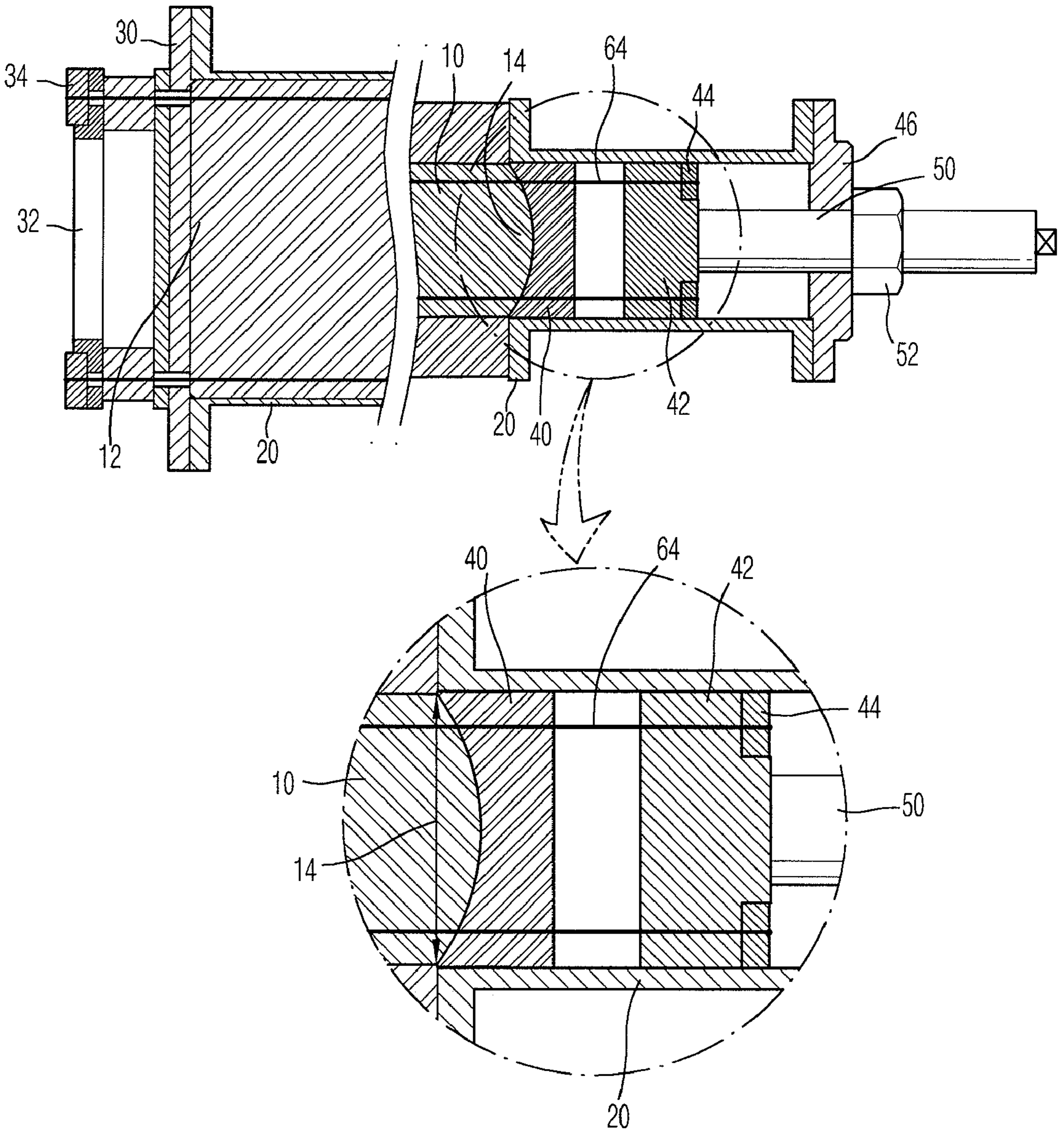
FIG. 1 PRIOR ART
FIG. 1 is a cross sectional view illustrating the construction of a conventional electric pole manufacturing apparatus.
Figure 2:
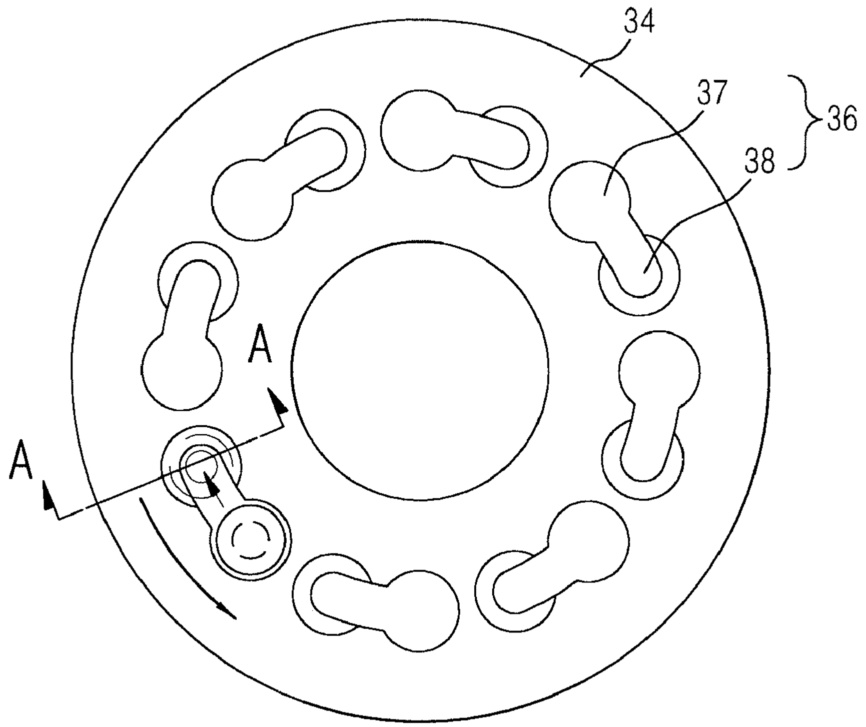
FIG. 2 PRIOR ART
FIG. 2 is a view illustrating a fastening structure of a tensile core of FIG. 1.
Figure 3:
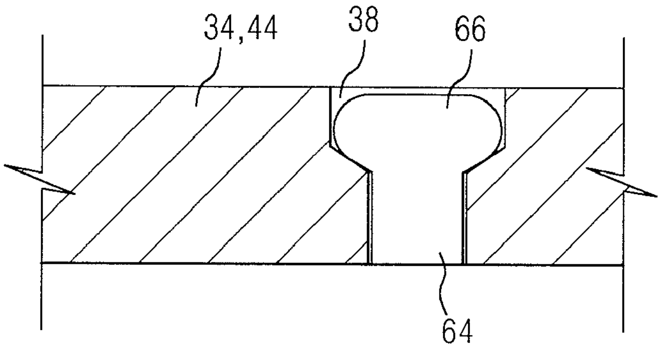
FIG. 3 PRIOR ART
FIG. 3 is a cross sectional view taken along a line A-A of FIG. 2.
Figure 4:
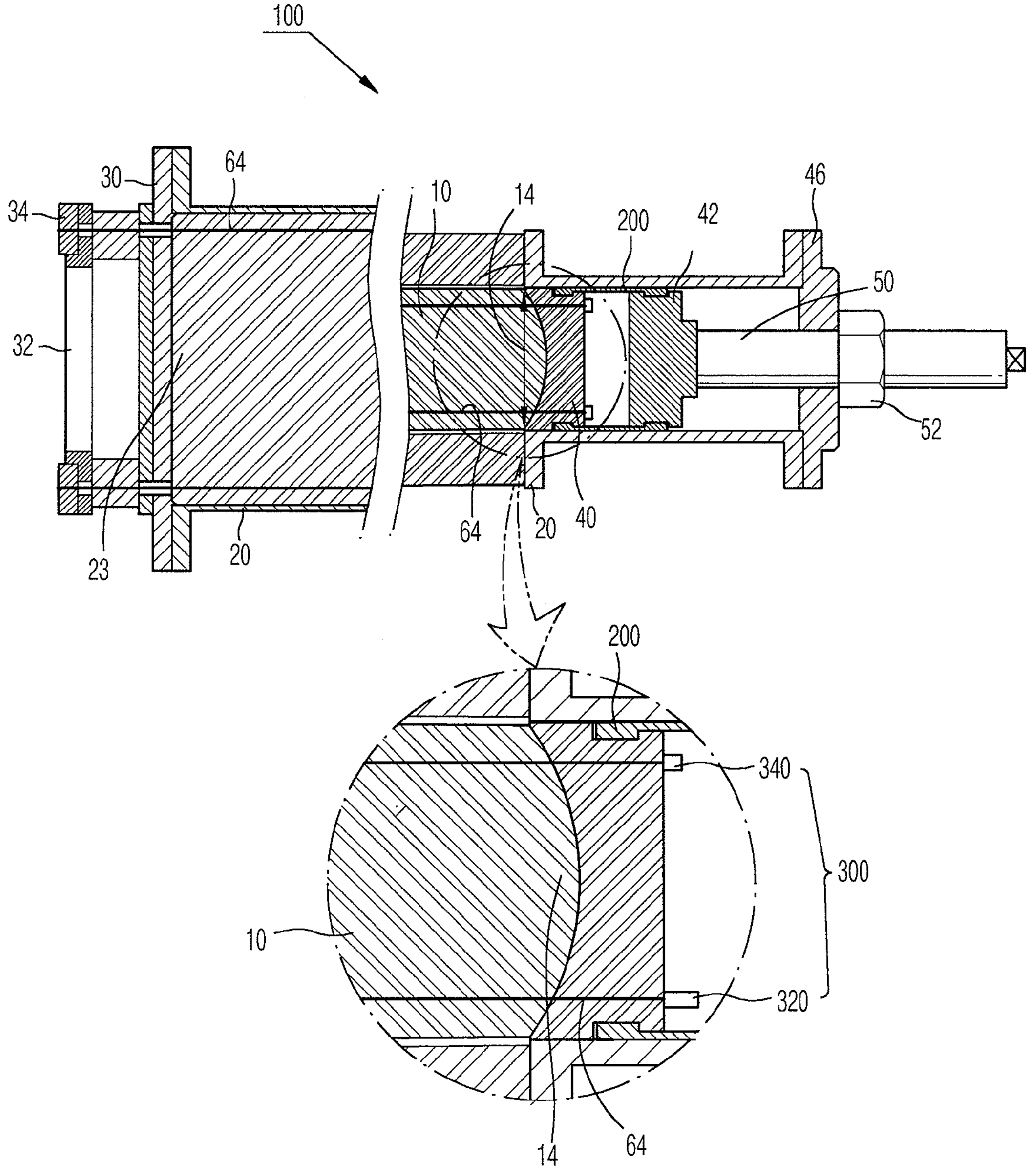
FIG. 4 is a cross sectional view illustrating the construction of an electric pole manufacturing apparatus according to one preferred embodiment of the present invention.

An electric pole manufacturing apparatus, generally indicated by a reference numeral 100 in FIG. 4, includes a mold 20 which is positionable in an opened or closed mode, a tensile core 64 mounted on the mold for forming a frame 60, and means for maintaining the tensile core in a stretching state.

Figure 5:
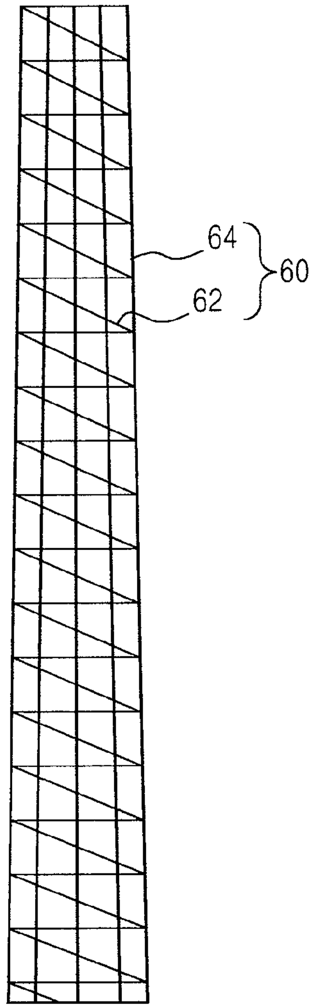
FIGS. 5 and 6 are front and cross sectional views of a reinforced concrete structure applied to an electric pole of the present invention.
Figure 6:
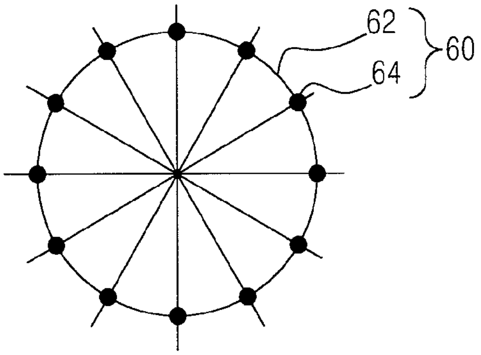

The frame 60 is composed of the tensile core 64 arranged in a circle, and iron wires 62 spirally wound and welded around the tensile core 64, shown in FIGS. 5 and 6.

Figure 7:
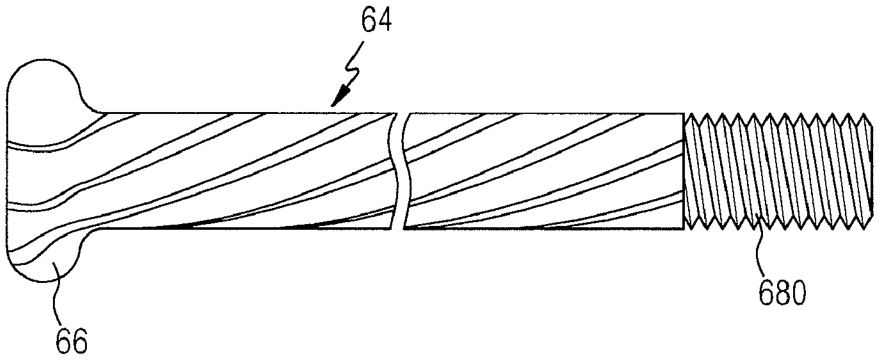
FIG. 7 is a view illustrating a tensile core of the present invention.

The tensile core 64 is provided on its one end with a head 66, and on its other end with a male threaded portion 680, as shown in FIG. 7.

The mold 20 is provided on its outer circumference with a plurality of rings (not shown) which are contacted with a rotary roller and receive rotary power from the rotary roller.

The mold 20 includes a proximal end plate 30 mounted to one end thereof for forming a proximal end 12 of the electric pole 10, a proximal end tensile plate 32 spaced from the proximal end plate 30 at a constant spacing, and a proximal end tensile core fixing plate 34 having a tensile core 64 with one side penetrating through a bottom surface of the proximal end tensile plate 32.

Figure 8:
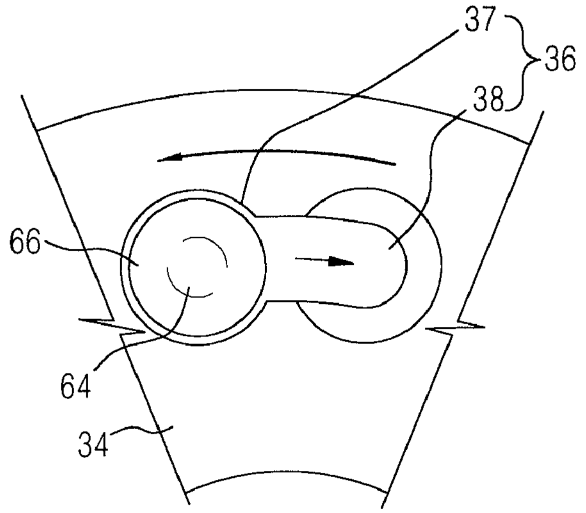
FIG. 8 is a view illustrating a fastening structure applied to one side of a tensile core of the present invention.
Figure 9:
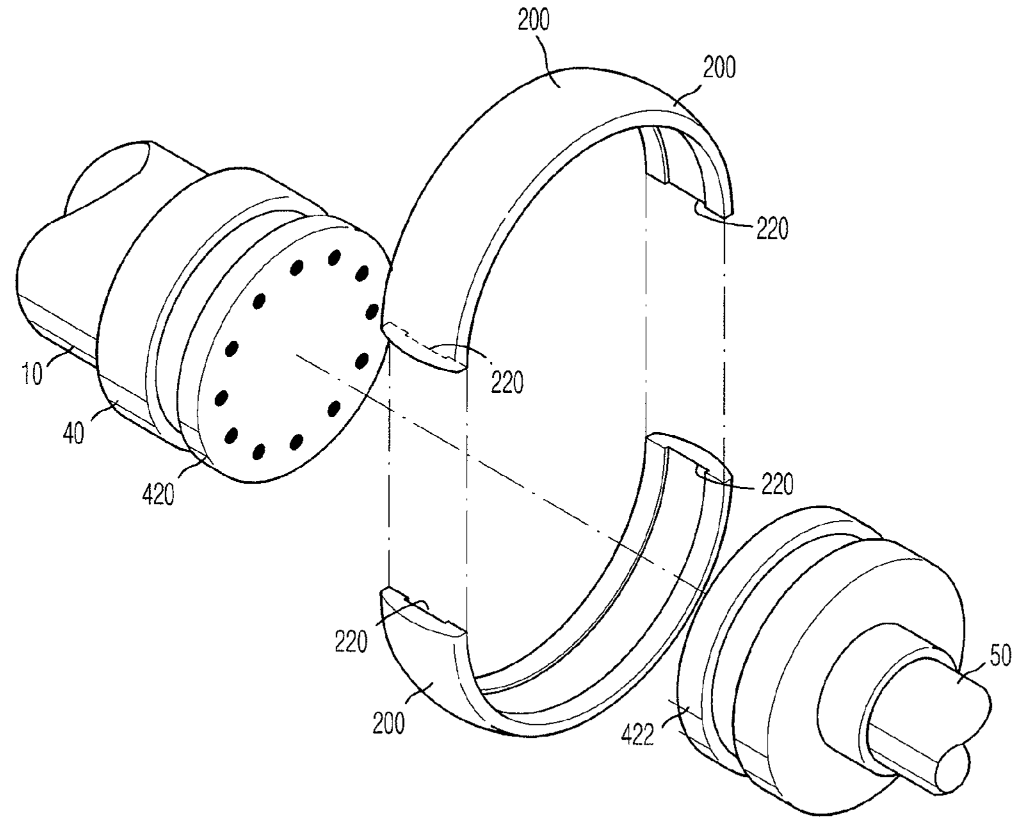
FIG. 9 is an exploded perspective view illustrating coupling means of the present invention.
Figure 10:
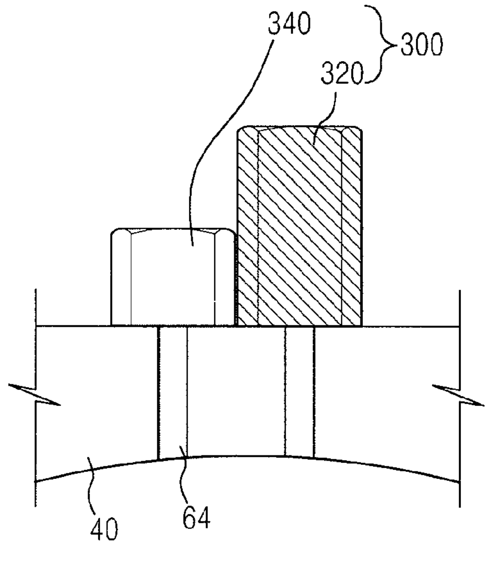
FIG. 10 is a view illustrating a fastening structure applied to one side of a tensile core of the present invention.

The proximal end tensile core fixing plate 34 is formed with a number of fastening holes 36 having a large-diameter portion 37 for receiving the head 66 of the tensile core 64 and a small-diameter portion 38 having a diameter corresponding to that of the tensile core 64 and supporting a bottom surface of the head 66, so as to engage and fix the head 66 of the tensile core 64, as shown in FIG. 8.

As shown in FIG. 4, the mold 20 further includes a distal end plate 40 mounted to one end thereof for forming a distal end 14 of the electric pole 10, through which the tensile core 64 extends, and a distal end tensile plate 42 connected to a butt-end plate 46 using a nut 52 for coupling to a tension shaft 50 lifted by a fastening force of the nut.

The distal end tensile plate 42 and the distal end plate 40 are engaged to each other by coupling means, so that the tensile force is applied to the distal end plate 40 by the rotation of the tension shaft 50.

The coupling means for a coupling ring 200 of a dividable structure, and a holder for holding the distal end plate 40 and the distal end tensile plate 42 using the coupling ring 200. The holder encloses outer circumferences of the distal end plate 40 and the distal end tensile plate 42 to form holding bosses 420 and 422. The coupling ring 200 is formed with a holding groove 220 receiving the holding bosses 420 and 422.

The distal end plate 40 coupled to the distal end tensile plate 42 for receiving the tensile force is formed with a plurality of female threaded holes for receiving a male threaded portion of the tensile core 64 and thus being fixed by tensile nut 300.

The number of female threaded holes may be increased or decreased depending upon a diameter and number of the tensile core 64, each defined by the design load of the electric pole 10. The tensile nut 300 for fastening the tensile cores 64, which are arranged in a circle at closely spaced between the tensile cores 64 inserted into the female threaded holes, consists of a long tensile nut 320 and a short tensile nut 340, the long and short tensile nuts 320 and 340 being alternatively disposed.

At that time, the long tensile nut 320 has a double height relative to that the short tensile nut 340. The reason is because after the short tensile nut 340 is fastened, the long tensile nut 320 is fastened or released using an impact wrench. Specifically, the long tensile nut 320 is fastened or released without inserting the impact wrench between the short and long tensile nuts.

The operation of manufacturing the electric pole using the apparatus according to the present invention will now be described.

First Process

A plurality of tensile cores 64 are cut to have a length of 250 to 300 mm shorter than that of the electric pole 10, and then are arranged along a longitudinal direction of the electric pole. Slender iron wires are wound and welded around the surroundings of the tensile cores 64 to form a frame 60. Both ends of the tensile core 64, arranged in a longitudinal direction in the frame, are heated and pressurized to form the head 66.

Second Process

A release agent is applied on the mold 20, and the head 66 of the tensile core 64 extend through the proximal end plate 30 and distal end tensile core 32, so that the head 66 of the tensile core 64 engages the fastening hole 36 of the proximal end tensile core fixing plate 34. The male threaded portion of the tensile core 64 penetrates through the female threaded hole of the distal end plate 40, and is fastened using the tensile nut 300. And then, the frame 60 prepared in the first process is seated on an opened mold 20.

Third Process

The distal end plate 40 coupled to the distal end tensile plate 42 through the coupling ring 200 is lifted by rotating the tension shaft 50 using the tensioner, so that the length of the tensile core 64 extending to the bottom of the distal end plate 40 is stretched to a position corresponding to the length of the electric pole 10.

At that time, the male threaded portion of the tensile core 64 is fastened to the distal end plate 40 using the tensile nut 300 so as to maintain the fastening force upon the stretch of the tensile core 64.

Fourth Process

The concrete is inputted into the mold 20, and the mold 20 is rotated in a closed state by a centrifuge to form a hollow of a thickness corresponding to that of the defined electric pole 10.

Fifth Process

The concrete of the electric pole 10 is treated through steam cure using a boiler to have a desired strength.

Sixth Process

The tensile core 64, extending between the proximal end plate 30 and the proximal end tensile plate 32, is cut using a welding rod. After that, the coupling ring 200 is released, and the electric pole is removed from the mold 20.

Seventh Process

After tensile cores 64 extending from the proximal end 12 are finely cut, and the distal end plate 40 is removed from the mold by releasing the tensile nut 300. The fine cut of the tensile cores 64 extending toward the proximal end 12 and distal end 14 and the natural cure are performed to complete the electric pole 10.

In the second process, the tensile nut 300 consists of the long tensile nut 320 and the short tensile nut 340, the long and short tensile nuts 320 and 340 being alternatively fastened. After the short tensile nut 340 is fastened, the long tensile nut 320 is fastened.

In the seventh process, after the long tensile nut 320 is released, the short tensile nut 340 is released.

Specifically, as means for stretching the tensile core 64, the distal end plate 40 is coupled to the distal end tensile plate 42 connected to the tension shaft by use of the coupling ring 200, thereby allowing the tensile force to be applied. It is possible to extend one end of the tensile core 64 through the distal end plate 40, thereby shortening the cut length of the tensile core 64 relative to the conventional tensile core.

In addition, one end of the tensile core 64 is fastened to the distal end plate 40 by use of bolts, so that the tensile core 64 may be stretched by the tensile force applied from the distal end plate 40. After the tensile core is cut to a length shorter than that of the electric pole 10, the tensile core 64 is stretched to a length corresponding to that of the electric pole 10, thereby allowing the cut length of the tensile core 64 to be shortened.

Furthermore, in the process of fastening one end of the tensile core 64 to the distal end plate 40 by use of bolts, the long and short tensile nuts 320 and 340 are alternatively used in define the space in which a fastening tool such as the impact wrench can be accommodated. Therefore, the distance between the tensile cores 64 is close, by spaced so that the number of tensile cores 64 may be increased or decreased in accordance with the design value of the electric pole 10.

The embodiments according to the above construction and process will now be described with reference to a below design table of the electric pole.

Design table of electric pole and short tensile nuts 320 and 340 are alternatively used to define the space in which a fastening tool such as the impact wrench can be accommodated.

In addition, if the length of the electric pole is 16 m, the tensile core 64 can be cut to have the length of 250 to 300 mm shorter than that of the electric pole 10. The tensile core 64 is rigidly coupled to the distal end plate 40 by use of bolts, thereby providing the distal end plate 40 with the tensile force and thus stretching the tensile core 64 by the length of the electric pole 10.

EMBODIMENT 2

If a length of the electric pole 10 is 16 m, a design load of the electric pole is 2000 kg, and a diameter of the distal end 14 is 260 mm, sixteen tensile cores 64 having a diameter of 15 mm are required. At that time, a spacing of the tensile cores 64 is 35.34 mm.

One end of the tensile core 64 is fastened to the distal end plate 40 by use of bolts. At that time, the long and short tensile nuts 320 and 340 are alternatively used to define the space in which a fastening tool such as the impact wrench can be accommodated.

In addition, if the length of the electric pole is 16 m, the tensile core 64 can be cut to have the length of 250 to 300 mm shorter than that of the electric pole 10. The tensile core 64 is rigidly coupled to the distal end plate 40 by use of bolts, thereby providing the distal end plate 40 with the tensile force and thus stretching the tensile core 64 by the length of the electric pole 10.

Meanwhile, although the tensile core 64 has on one end thereof the head 66 and on the other end thereof a female

| Length of electric pole (m) | Design load (Kg) | Diameter of distal end (mm) | Thickness of electric pole (mm) | Diameter of tensile core (mm) | Number of tensile core | Distance of tensile core from center axis (mm) | Spacing of tensile cores (mm) | Remarks |
|---|---|---|---|---|---|---|---|---|
| 16 | 1000 | 190 | 60 | 13 | 7 | 65 | 29.17 | |
| | | | | 11 | 7 | | | |
| 16 | 1000 | 190 | 60 | 13 | 12 | 65 | 34.03 | |
| 16 | 1100 | 220 | 65 | 13 | 12 | 77.5 | 40.58 | |
| 16 | 1200 | 220 | 65 | 13.5 | 12 | 77.5 | 40.58 | |
| 16 | 1300 | 220 | 65 | 14 | 14 | 12 | 40.58 | |
| 16 | 1400 | 220 | 65 | 15 | 12 | 77.5 | 40.58 | |
| 16 | 1500 | 220 | 65 | 15.5 | 12 | 77.5 | 40.58 | |
| 16 | 1600 | 260 | 70 | 13 | 16 | 95 | 37.31 | |
| 16 | 1700 | 260 | 75 | 13.5 | 16 | 92.5 | 36.32 | |
| 16 | 1800 | 260 | 75 | 14 | 16 | 92.5 | 36.32 | |
| 16 | 2000 | 260 | 80 | 15 | 16 | 90 | 45.34 | |

Figure 11:
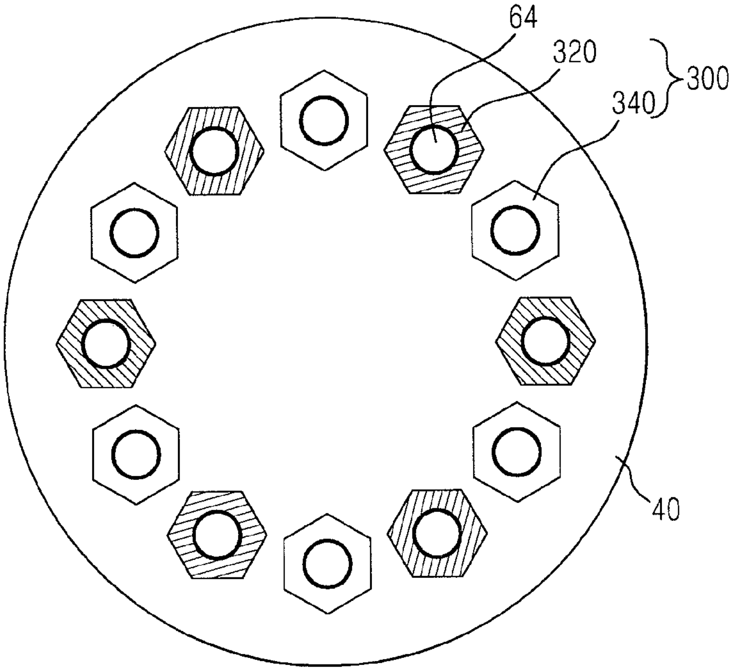
FIGS. 11 and 12 are plan view showing the state employing the fastening structure of FIG. 10.
Figure 12:
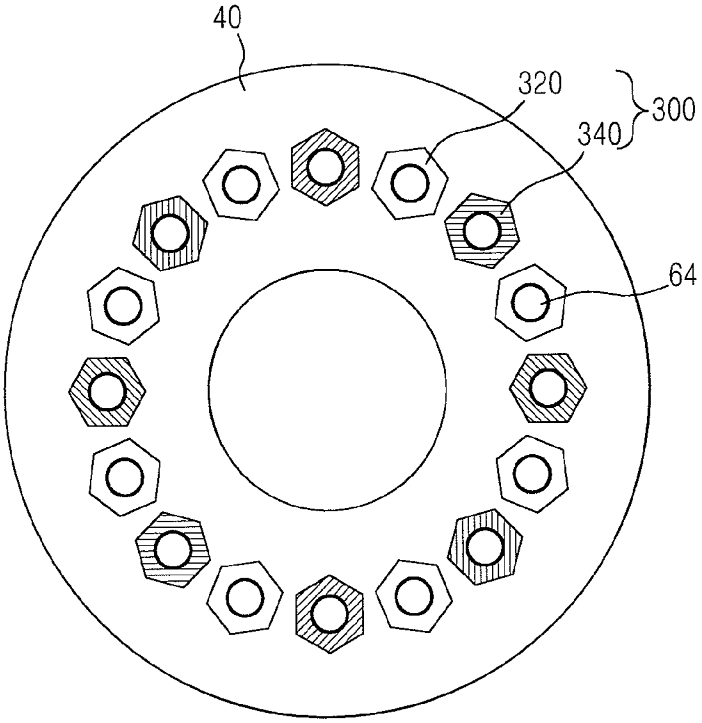

The above design is the results of the test performed by employing the present invention, and embodiments will now be described with reference to FIGS. 11 and 12.

EMBODIMENT 1

If a length of the electric pole 10 is 16 m, a design load of the electric pole is 1400 kg. and a diameter of the distal end 14 is 220 mm, twelve tensile cores 64 having a diameter of 15 mm are required. At that time, a spacing of the tensile cores 64 is 40.58 mm.

One end of the tensile core 64 is fastened to the distal end plate 40 by use of the bolting manner. At that time, the long threaded portion 68 in the tensile core 64 in the present embodiments, the present invention is not limited thereto. In other words, the head 66 may be formed both ends of the tensile core 64, and the distal end plate 40 is formed with a female threaded hole such as that formed on the proximal end tensile core fixing plate 34.

If the heads 66 formed on both ends of the tensile core 64 extend through and are fastened to the female threaded hole 36 formed in the proximal end tensile core fixing plate 34 and distal end plate 40, since the distal end plate 40 is loaded with the tensile force, the tensile core 64 can be stretched tight. At that time, a length of the tensile core 64 extending toward the distal end 14 is shorter than that of the conventional tensile core, so that unnecessary length of the tensile core 64 may be shortened.

Although the embodiments of the present invention are applied to the electric pole consisting of reinforced concrete structure, the present invention is not limited thereto. The present invention may be applied to another reinforced concrete structure with a tensile core such as file or hume pipe arranged.

INDUSTRIAL APPLICABILITY

With the construction described above, the distal end plate forming the distal end of the electric pole is applied with the tensile force. Accordingly, it is possible to extend one end of the tensile core through the distal end plate, thereby shortening the cut length of the tensile core relative to the conventional tensile core.

In addition, the tensile core is fastened to the distal end plate by use of bolts, so that the tensile core may be stretched by the tensile force applied from the distal end plate. After the tensile core is cut in a length shorter than that of the electric pole, the tensile core is stretched in a length corresponding to that of the electric pole, thereby allowing the cut length of the tensile core to be shortened.

Furthermore, in the process of fastening one end of the tensile core to the distal end plate by use of bolts, the long and short tensile nuts are alternatively used to preclude the space in which a fastening tool such as the impact wrench can be accommodated. Therefore, the distance between the tensile cores is close spaced, so that the electric pole may be manufactured in accordance with the design value of the electric pole.

The exposed space of the distal end through the distal end plate is eliminated, thereby preventing the shape of the distal end from being poor due to moisture discharge.

The foregoing embodiments are merely exemplary and are not to be construed as limiting the present invention. The present teachings can be readily applied to other types of apparatuses. The description of the present invention is intended to be illustrative, and not a limit the scope of the claims. Many alternatives, modifications, and variations will be apparent to those skilled in the art.

The invention claimed is:

1. An apparatus of manufacturing an electric pole, the apparatus comprising:

a mold having a dividable structure;

a proximal end plate mounted to one end thereof for forming a proximal end of the electric pole, with a tensile core extending through one side thereof;

a proximal end tensile plate spaced from the proximal end plate at a constant spacing;

a proximal end tensile core fixing plate having the tensile core with one end of the tensile core extending through a surface of the proximal end tensile plate;

a distal end plate mounted to one end thereof for forming a distal end of the electric pole, through which the tensile core penetrates;

a distal end tensile plate connected to a butt-end plate using a connector for coupling to a tension shaft loaded by a fastening force of the connector; and means for coupling the distal end tensile plate and the distal end plate to apply the tensile force to the distal end plate.

2. The apparatus as claimed in claim 1, wherein the coupling means has a coupling ring of a dividable structure, and a holder for holding the distal end plate and the distal end tensile plate using the coupling ring.

3. The apparatus as claimed in claim 1, wherein the holder encloses outer circumferences of the distal end plate and the distal end tensile plate to form holding bosses, and the coupling ring is formed with a holding groove receiving the holding bosses.

4. The apparatus as claimed in claim 1, wherein the tensile core is provided on each respective side side with a head and a male threaded portion, a corresponding proximal end tensile core fixing plate is formed with a fastening hole through which the head of the tensile core is inserted and lead, and the distal end plate is formed with a female threaded hole for receiving the male threaded portion of the tensile core.

5. The apparatus as claimed in claim 1, wherein the connector comprises a plurality of nuts for fastening the male threaded portion of the tensile cores including a longer tensile nut and a shorter tensile nut, the longer and shorter tensile nuts being alternatively disposed in the distal end.

6. A method of manufacturing an electric pole, the method comprising the steps of:

a) winding and welding an iron wire around a surrounding of a tensile core to form a frame, and heating and pressurizing both ends of the tensile core arranged in a longitudinal direction in the frame to form a head on one end thereof and a male threaded portion on the other end thereof;

b) inserting the head of the tensile core into the proximal end plate and distal end tensile core, so that the head is caught into a fastening hole of the proximal end tensile core fixing plate, and inserting threading the male threaded portion of the tensile core into a female threaded hole of the distal end plate using a tensile nut, thereby seating the frame on an opened mold;

c) lifting the distal end plate coupled to the distal end tensile plate through a coupling ring by rotating a tension shaft using a tensioner, so that a length of the tensile core extended to a bottom of the distal end plate is stretched to a position corresponding to a length of the electric pole;

d) inputting concrete into the mold, and rotating the mold while the mold is closed using a centrifuge to form a hollow of a thickness corresponding to a defined thickness of the electric pole;

e) curing the concrete in the mold to provide the electric pole with a desired strength;

f) removing the electric pole from the mold by cutting the tensile core extended between the proximal end plate and the proximal end tensile plate and releasing the coupling ring; and g) after cutting the tensile core extending from the proximal end, and removing the distal end plate from the mold by releasing the tensile but cutting the tensile cores extending toward the proximal end, and curing the distal end and the natural to complete the electric pole.

7. The method as claimed in claim 6, wherein the step b), the tensile nut comprises a plurality of nuts including a long tensile nut and a short tensile nut, which are alternatively fastened, and after the short tensile nut is fastened, the long tensile nut is fastened.

8. The method as claimed in claim 6, wherein in the step b), tensile nut comprises a plurality of nuts including a longer tensile nut and a shorter tensile nut, which are alternatively fastened, and after the longer tensile nut is fastened, the shorter tensile nut is fastened.

* * * * *